Aug. 6, 1940.   D. D. HOGARTH   2,210,293
INDICATING APPARATUS FOR FUEL TANKS
Original Filed July 22, 1938
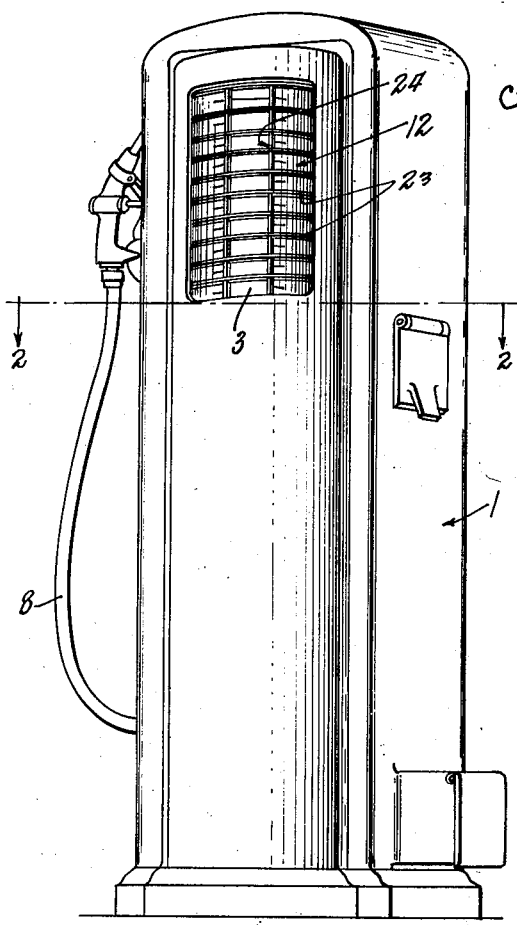
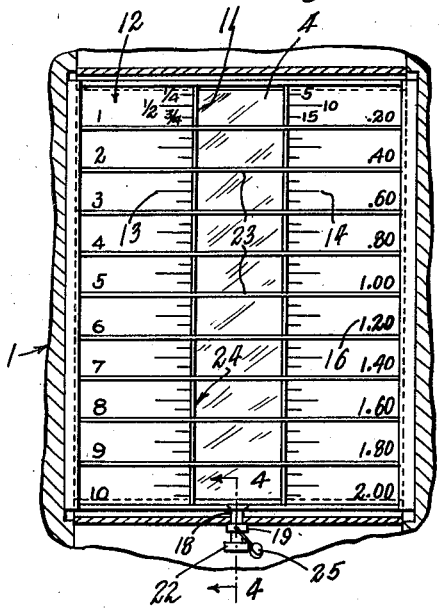
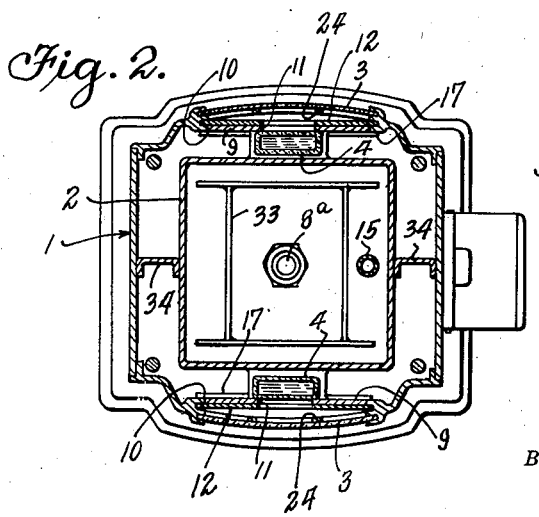
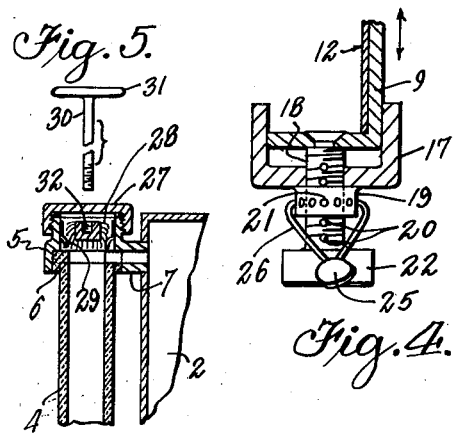
INVENTOR
Donald D. Hogarth
BY Lyon & Lyon
ATTORNEYS Patented Aug. 6, 1940

2,210,293

UNITED STATES PATENT OFFICE 2,210,293

INDICATING APPARATUS FOR FUEL TANKS

Donald D. Hogarth, Los Angeles, Calif.

Original application July 22, 1938, Serial No. 220,695. Divided and this application February 15, 1939, Serial No. 256,489

1 Claim. (Cl. 73—62)

This application is a division of an application entitled "Dispensing apparatus for filling stations," filed July 22, 1938, Serial No. 220,695.

The apparatus now generally employed at gasoline filling stations for automobiles, usually includes an elevated tank from which the gasoline flows in passing through the hose to the tank of the car. It is also usual to provide a meter for measuring the gasoline as it flows to the tank, and the meter usually drives an indicator that indicates the charge to be made for the gasoline at the price per gallon. A flow meter of this type must be very accurately constructed in order to enable it to measure accurately the amount of gasoline that passes the meter, particularly large quantities.

One of the objects of the present invention is to provide simple means for indicating the quantity of gasoline dispensed from such an elevated tank or reservoir, and the amount to be charged for the same without necessitating the use of a flow meter.

In accordance with the invention, the elevated tank or reservoir from which the gasoline is dispensed, is constructed or so arranged that the level of the gasoline within the tank can be observed by the attendant and the purchaser of the gasoline, and involves the use of cards cooperating with the tank or reservoir carrying a scale to indicate the quantity of gasoline dispensed, as well as the charge for the same at a given price. If the price of the gasoline is changed, it is merely necessary to substitute a card with a scale carrying computed charges thereon corresponding to the new rate of price. When a card of this kind is used to indicate the quantity of gasoline sold in this way, the inspection rules require that this card be secured and sealed by the inspector, in a fixed position. One of the objects of the invention is to provide a construction for facilitating the indication to the attendant and the driver of the automobile, that the correct quantity of fuel has been delivered; and also to provide a simple construction whereby the cost of the quantity delivered is also indicated; also to accomplish this in such a way that the cost cards giving the total cost of different quantities of gasoline at different rates, can readily be substituted for each other. Also to provide a construction for carrying the cards, which will enable the position of the cards at the reading gauge to be readily adjusted so that the readings on the cards are accurate with respect to the quantity of fuel delivered and its cost, at the same time, permitting the cards to be held fixed and sealed by a Government or State inspector, in any position into which the card has been adjusted.

In practicing the invention, I prefer to employ a sight tube of translucent or transparent material, disposed in a substantially vertical position, and the ends of which are in communication with the interior of the gasoline reservoir; and one of the objects of the invention is to provide means in connection with the mounting and composition of the sight tube that will insure safety from fire, and avoid the necessity for using an easily broken material such as glass, for the sight tube.

Further objects of the invention will appear hereinafter.

The invention consists in the novel parts and combination of parts to be described hereinafter all of which contribute to produce an efficient indicating apparatus for fuel tanks.

A preferred embodiment of the invention is described in the following specification, while the broad scope of the invention is pointed out in the appended claim.

In the drawing:

Fig. 1 is a perspective of a gasoline pump housing embodying my improvements.

Fig. 2 is a horizontal section taken slightly above the line 2—2 of Fig. 1.

Fig. 3 is a view in the nature of a front elevation illustrating the card holder and the means for mounting and adjusting the same so as to enable it to indicate accurately the amount of gasoline dispensed and the charge to be made for the same.

Fig. 4 is a vertical section taken about on the line 4—4 of Fig. 3, but upon an enlarged scale, and further illustrating means for regulating the position of the card at the forward side of the reservoir.

Fig. 5 is a vertical section taken at the upper end of the housing in a front and rear plane, and particularly illustrating details of a connection for the ends of the glass gauge tube, to the ends of the gasoline tank, and also illustrating means that may be employed to enable this glass tube to be kept clean.

Referring more particularly to the parts, 1 indicates an upright housing on the upper portion of which a reservoir 2 for the fuel such as gasoline, is supported. Although this reservoir may be of glass so that it has a transparent wall enabling the level of the liquid to be observed, I prefer to construct the reservoir of metal, preferably sheet metal. As illustrated, the reservoir 2 is of substantially square cross-section, but if desired, it may be circular in cross-section. The circular cross-section has some advantage over the square cross-section, because the hydrostatic pressure on the interior of the reservoir of circular form, cannot distort the wall. This, of course, is possible with a square or polygonal cross-section if the walls are sufficiently thin, as the pressure would tend to bulge them and cause inaccuracies in reading on the indicator card, as will be explained more fully hereinafter. If the wall of this reservoir is so thin that it would tend to bulge in the manner suggested, staying means would be employed preventing distortion of the walls from the internal pressure.

In order to enable the level of the fuel to be observed from the outside, I provide the front and rear walls of the casing with a window opening preferably covered by a sheet 3 of transparent material, and disposed in a vertical position. At about the middle point of this window, I provide a transparent sight tube 4 (see Figs. 2 and 5). These transparent tubes are connected at their upper and lower ends to the interior of the reservoir 2. For this purpose socket-form heads 5 are provided to receive the ends of the tubes, and suitable soft gaskets 6 are provided for the heads to prevent leakage at these points; and the interior of these socket heads communicate through tubular nipples 7 with the interior of the reservoir. With this arrangement it will be evident that the liquid will stand in these tubes at the same level as in the reservoir. The reservoir is, of course, provided with means such as an ordinary hose 8 connected with an outlet 8a at the bottom of the reservoir (see Fig. 2) and through which the fuel can be withdrawn and delivered into an automobile tank.

Back of each transparent plate 3, I provide a card frame 9, the edges of which are guided to slide for adjustment up and down in an opening 10 provided in the wall of the casing (see Fig. 2). This card carrier 9 is in the form of a plate with a vertical opening 11 at its middle point, through which the tube 4 may be seen. On the forward face of the carrier, a card 12 is removably carried, the middle portion of which is cut away to form an opening registering with the opening 11. In this way vertical edges are formed on the card, at which two scales 13 and 14 are provided. The scale 13 at the left is intended to indicate gallons and quarter gallons, and on this side of the card in addition to the long and short lines indicating quarter gallons, I provide a series of numbers 1, 2, 3, 4, etc., indicating complete gallons as measured from the zero line or level of the gasoline when the reservoir is at rest. This zero line or level would, of course, correspond with the overflow tube 15 of the reservoir (see Fig. 2).

Over at the right of the card a price scale 16 is provided, indicating the cost of gallonage of fuel dispensed, and reading progressively downwardly. For example, if the price of the gasoline is twenty cents, the scale numbers will progress by differences of twenty cents.

In order to comply with inspection laws, it is necessary that this card, or carrier, be sealed in a fixed position by the inspector after he has tested the reservoir and scale to ascertain whether the scale will indicate correctly the amount of fuel dispensed. For this purpose the lower end of the carrier 9 is preferably supported in a horizontal frame bar 17, the lower end of the carrier 9 being provided with a pin 18 that is swiveled in the lower end of the card frame 9 and threaded through a boss 19 projecting downwardly from the lower end of the frame bar 17. This pin 18 is provided with a plurality of closely placed perforations or small openings 20, that may align with similar perforations 21 in the boss 19. The lower end of the pin 18 has a head 22 enabling the pin to be pushed up or down slightly, to hold the card at any desired level. This is also advisable to enable the "even gallon" division lines on the scale 13 to register accurately with the horizontal bars 23 of a grid 24 that is immediately back of the transparent plate 3, and which operates as a guard to prevent the tubes 4 from being accidentally broken. After the inspector has properly adjusted the card carrier, he may seal the same in any desired position by means of a seal 25, sealing the ends of a wire 26 that passes through the aligned holes 20 and 21.

Some fuels have a tendency to form a coating or deposit on the inner face of the transparent tube, such as the two tubes 4. In order to overcome this objection, I prefer to provide each socket head 5 with a removable screw cap 27 which may be removed when desired, and just under this screw cap in a chamber provided in the socket, I provide a small brush 28 that is normally held up by oppositely disposed small springs 29. When it is necessary to clean the tubes 4, these caps 27 would be removed and a stem 30 with a handle 31 at its upper end, would be screwed into a threaded socket 32 in the block or body of the brush. This stem 30, of course, would be long enough to reach the entire length of the tube. In this way, the tubes 4 can be swabbed out and cleaned when desired.

Although the tubes 4 may be constructed of glass, I prefer to form them of a composition known as ethyl-cellulose. This material is transparent, is insoluble in gasoline, and is also non-inflammable. If this material is used, it is not essential to use the protecting grid 24 and transparent plate 3, although if desired, these may be used as an extra precaution against breaking.

When the gasoline flows out of the reservoir, there may be a tendency to agitate the liquid, and this might cause slight movements of the liquid level as observed on the indicator card. In order to overcome this objection, the interior of the reservoir is preferably provided with a baffle 33 constructed of bars or plates that will resist the agitation of the liquid and tend to keep it in a more or less placid condition.

In a reservoir of rectangular or square cross-section, outside stays or braces 34 in the form of vertical bars may be provided between the side walls of the housing and the reservoir (see Fig. 2). This will prevent any bulging of thin side walls and will insure that the card will accurately indicate the amount of gasoline dispensed at its correct cost.

Many other embodiments of this invention may be resorted to without departing from the spirit of the invention.

What I claim is:

In an indicator for indicating a reservoir level for dispensing apparatus at automobile filling stations, the combination of a transparent wall at which the liquid level is indicated, a card frame, a card removably carried in said frame having numbered graduations indicating a unit of measure and the cost of measured quantities of the fuel dispensed down to the indicated level, means for adjusting the card frame up or down to enable the card to give an accurate indication of the quantity of fuel dispensed, means for sealing the card frame in different adjusted positions, and a rigid protecting grid located in front of the said transparent wall protecting the same and having substantially horizontal bars substantially registering with the horizontal division lines on the said card.

DONALD D. HOGARTH.